United States Patent [19]
Vrielink et al.

[11] Patent Number: 4,482,954
[45] Date of Patent: Nov. 13, 1984

[54] SIGNAL PROCESSOR DEVICE WITH CONDITIONAL INTERRUPT MODULE AND MULTIPROCESSOR SYSTEM EMPLOYING SUCH DEVICES

[75] Inventors: Hendrik Vrielink; Eduard M. A. M. van der Ouderaa; Adriaan Willemse, all of Eindhoven, Netherlands

[73] Assignee: U.S. Philips Corporation, New York, N.Y.

[21] Appl. No.: 521,025

[22] Filed: Aug. 9, 1983

Related U.S. Application Data

[63] Continuation of Ser. No. 189,285, Sep. 22, 1980, abandoned.

[30] Foreign Application Priority Data

Sep. 27, 1979 [NL] Netherlands ............. 7907179

[51] Int. Cl.³ .................. G06F 15/16; G06F 13/00
[52] U.S. Cl. ........................................ 364/200
[58] Field of Search ... 364/200 MS File, 900 MS File; 370/85, 86, 92

[56] References Cited

U.S. PATENT DOCUMENTS

| | | | |
|---|---|---|---|
| 3,286,236 | 11/1966 | Logan et al. | 364/200 |
| 3,421,150 | 1/1969 | Quosig et al. | 364/200 |
| 3,445,822 | 5/1969 | Driscoll | 364/200 |
| 3,566,357 | 2/1971 | Ling | 364/200 |
| 3,614,741 | 10/1971 | McFarland, Jr. | 364/200 |
| 3,665,404 | 5/1972 | Werner | 364/200 |
| 3,710,351 | 1/1973 | Nakamura | 364/200 |
| 3,771,146 | 11/1973 | Cotton et al. | 364/200 |
| 3,812,463 | 5/1974 | Lahti et al. | 364/200 |
| 3,813,651 | 5/1974 | Yamada | 364/200 |
| 4,059,851 | 11/1977 | Nuttley | 364/200 |
| 4,086,627 | 4/1978 | Bennett et al. | 364/200 |
| 4,096,572 | 6/1978 | Namimoto | 364/200 |
| 4,115,851 | 9/1978 | Nagano et al. | 364/200 |
| 4,130,865 | 12/1978 | Heart et al. | 364/200 |
| 4,162,529 | 7/1979 | Suzuki et al. | 364/200 |
| 4,242,749 | 12/1980 | Takezoe | 370/85 |

OTHER PUBLICATIONS

IEEE Proc. of the Annual Symposium on Computer Architecture, Jan. 19–21, 1976, vol. 3, pp. 34–39.

Primary Examiner—Raulfe B. Zache
Assistant Examiner—William G. Niessen
Attorney, Agent, or Firm—Jack E. Haken; James J. Cannon, Jr.

[57] ABSTRACT

Signal processor device having a processor module and a conditional interrupt module for use in a multiprocessor system employing these signal processor devices. The processor module has address, data and control inputs and outputs, including an interrupt signal input for receiving an incoming interrupt request signal. The signal processor device has at least one conditional nterrupt module in which the identity address of the signal processor is present, said interrupt module having inputs for receiving an incoming external interrupt request signal with corresponding destination address. The conditional interrupt module also has comparators in which its identity address is compared with the destination address. If the addresses agree, an interrupt signal is fed to the interrupt signal input of the processor module. The processor module may also have an interrupt signal output and be provided with an arbitration module to prevent conflicts between several interrupt requests. The provision of the conditional interrupt module enables interrupts to be processed in a multiprocessor system employing a plurality of such devices without all the devices being initially interrupted and without it being necessary to provide a multiplicity of interrupt lines.

6 Claims, 19 Drawing Figures

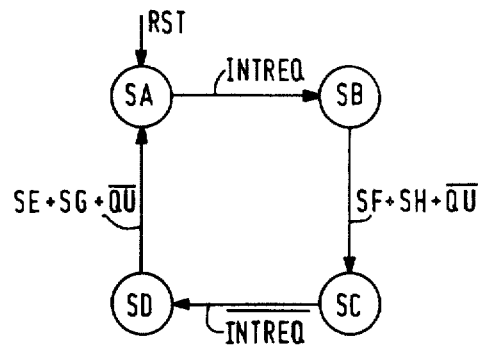
FIG.9a
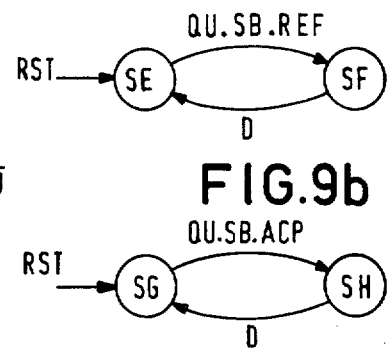
FIG.9b
FIG.9c
FIG.9d
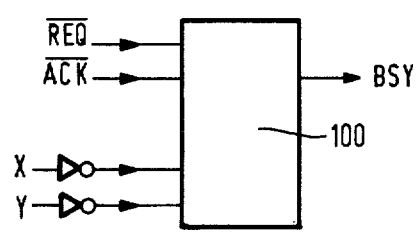
FIG.10
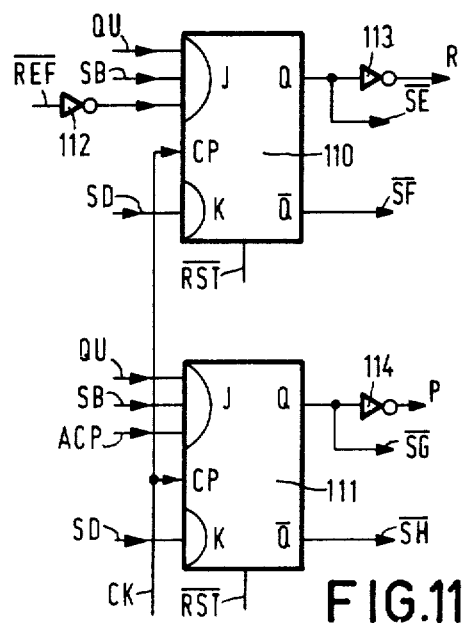
FIG.11

SIGNAL PROCESSOR DEVICE WITH CONDITIONAL INTERRUPT MODULE AND MULTIPROCESSOR SYSTEM EMPLOYING SUCH DEVICES

This application is a continuation of application Ser. No. 189,285 filed 9/22/80 now abandoned.

BACKGROUND OF THE INVENTION

1. Field of the Invention

The invention relates to a signal processor with a processor module having address, data and control inputs and outputs, including an interrupt signal input for receiving an incoming interrupt request signal. Such devices, particularly if equipped with so-called microprocessors as signal processor modules, are increasingly used in systems in which two or more processor modules are working together: multiprocessor systems. In such a system, it is of the utmost importance that interrupt requests are processed in such a way that the operation of the system itself is affected as little as possible. The interrupt mechanism of well-known microprocessors operates as follows: upon receipt of an interrupt request signal at the interrupt signal input, the microprocessor will complete the current instruction after which the interrupt request will be processed.

When a processor module in a multiprocessor system wishes to communicate with one or more processor modules, this may take place in the following obvious manner: an individual interrupt request signal line runs from each processor module to all other processor modules. The required processor module is then interrupted by energizing the appropriate line. The obvious disadvantage of this method is that the number of interrupt request signal lines increases almost quadratically $(n.(n-1))$ with the number of processor modules. Therefore, this solution is not acceptable in practice.

2. Description of the Prior Art

A conventional solution is known from "Electronics" of 20th Jan. 1977, page 107, FIG. 8, in which use is made of only one interrupt request signal line which is common to all processor modules. As soon as a particular processor module makes an interrupt request, all other processor modules will be interrupted. The interrupt vector (which is specifically the destination address corresponding to the interrupt request) which is applied to the system bus by said processor module, is compared with the identities of the receiving processor modules by means of a program routine loaded into these processor modules.

Each of the processor modules then decides whether the interrupt request is intended for it. A great disadvantage of this procedure is that, at the start of each communication, all processor modules are temporarily obstructed in their progress: the program routine for the above-mentioned comparison causes the processor modules temporarily to interrupt their normal operation.

SUMMARY OF THE INVENTION

The aim of the invention is to mitigate the disadvantages of the above-mentioned solutions. The signal processor device therefore has the feature that at least one conditional interrupt module is present containing the identity address of the signal processor module itself and which is provided with inputs for receiving an external interrupt request signal with a corresponding destination address and which is furthermore provided with a comparator means having inputs for its own identity address and the said destination address and an output for transmitting coincidence signal when it has been established that the two addresses are in agreement so that an interrupt signal is applied to the interrupt signal input of the signal processor module.

Thus the signal processor device contains one or more conditional interrupt modules in addition to the signal processor module. In a system in which a number of signal processor devices are connected to one data bus, each conditional interrupt module of the signal processor devices will compare its own identity address with the destination address of the interrupt request signal as soon as an interrupt request signal line is energized. It is thus ensured that only the processor module for which both addresses are in agreement will receive an interrupt signal at its interrupt signal input. All other processor modules in the system can continue their operations unhindered, because the interrupt request is ignored owing to the signals not being in agreement.

An additional advantage of this invention is that the software in each processor module becomes simpler because only one interrupt service routine need be present for the interrupt request intended for the relevant processor module itself.

In the event of a signal processor device containing a number of conditional interrupt modules, a signal processor unit may respond to more than one identity. The identity address then has, for example, two parts: the address of the processor module itself and another part indicating a particular process to be executed by this processor module.

This process may be a particular program routine, calculation routine, etc. This will not be discussed any further because it does not affect the essence of the invention.

The invention includes this extension without the need of taking further additional measures which are not immediately obvious.

In practice it will often occur that signal processor modules are equipped not only with an interrupt signal input but also with an interrupt signal output for delivering an outgoing interrupt request signal to an external device. This fact should be taken into account in order to prevent conflicting conditions from arising when incoming and outgoing interrupt request signals are occurring simultaneously. In view of this, a signal processor device employing a signal processor module which is further provided with an interrupt signal output, may have the feature that the conditional interrupt module is further provided with gates for passing an outgoing destination address which corresponds to the outgoing interrupt request and a control input of said gates serving for receiving an acknowledge signal indicating that the outgoing interrupt request has been acknowledged. In a system containing two or more signal processor devices, the said acknowledge signal which indicates that a possible attempt of the relevant signal processor module itself to deliver an outgoing interrupt request signal has been acknowledged, may come from a central arbitration module. Such an arbitration module monitors the priority in the processing of the various interrupt requests coming from the individual signal processor devices. For an example of a multiprocessor system with such a central arbitration module, the reader is referred to Computer Design of March 1978, page 82, FIG. 2 and page 85, FIG. 5. If, according to the order of priority in a multiprocessor system, the relevant signal processor module is due to have its outgoing interrupt request come into play, this will be indicated by said acknowledge signal and the destination address will be applied to the address bus via the gates.

It is also possible to use a decentralized arbitration function; see the above-mentioned article in Computer Design, FIG. 4. This is also practicable within the scope of the invention. A foremost consideration should be, however, that decentralization must not result in the operation of the processor modules themselves being interfered with. As regards this aspect of the invention, the signal processor device therefore may have the feature that it also contains an arbitration module with a first input for receiving a first acknowledge signal from outside the device and a second input for passing on an outgoing interrupt request signal from the processor module itself and which generates a further acknowledge signal if the two signals are present at a first output of the arbitration module, which acknowledge signal is fed to the control input of the gates with which the outgoing interrupt request signal and the destination address are released, in which case an outgoing acknowledge signal will then appear at a second output of the arbitration module, if, on receipt of the said first acknowledge signal, no outgoing interrupt signal from the processor module itself occurs.

The arbitration module forms no part of the signal processor module itself but operates independently in the signal processor device.

In a subsequent signal processor device present in such a system, the said outgoing acknowledge signal serves as the first acknowledge signal received from outside the device. Thus a chain connection is made as it were between the arbitration modules of the signal processor devices included in such a system.

In practice, a processor module itself indicates whether it can accept an interrupt request, which may be done by means of a refuse output which is or is not energized. To make it possible for this function to be used in the signal processor device of the present application, this device may have the feature that the conditional interrupt module is furthermore provided having AND gates with a first input for receiving said coincidence signal and a second input for receiving a second signal indicating that the signal processor module is in a state allowing an interrupt (REF).

In particular uses of a multiprocessor system, it may be useful to enable subsets of processor modules to be interrupted, notably subsets having addresses which are (equal to or) greater than the destination address of the interrupt vector.

The reverse is of course also possible: subsets having addresses which are (equal to or) less than the destination address. To realize this function in the signal processor device of the present application, the device may have the feature that the comparators is capable of determining not only whether the identity address of the processor is equal to the destination address presented, but, instead thereof, also whether the identity address is greater (or less) than the destination address, and depending upon the result, an interrupt signal is fed to the interrupt signal input of the signal processor module. To prevent conflicting conditions from occurring owing to the fact that a processor module simultaneously transmits and receives an interrupt request because the relevant processor module itself lies within the "greater than" (or "less than") address range, the device may have the additional feature that the AND-gates are provided with a third input for passing on a third signal indicating that there is no acknowledgement for transmitting an interrupt request signal from the processor module itself, with which signal it is indicated that interruption of the processor module itself is possible (provided the other conditions at the first and second input of the AND-gates are satisfied).

The signal processor device may also contain a so-called handshake module with which both the control and data signal transport synchronization with other devices outside the signal processor device is ensured. This applies, in particular, to multiprocessor systems in which two or more processor devices are connected to a common data and control signal transport bus.

In view of the increasing possibilities presented by the solid-state integration technology, the signal processor device can be constructed as an integrated circuit on a substrate.

Embodiments of the invention will be described by way of example with reference to the accompanying diagrammatic drawings. It is pointed out, however that the scope of the invention is not restricted thereto.

BRIEF DESCRIPTION OF THE DRAWINGS

FIGS. 9a to d are the state diagrams of a handshake module.

FIGS. 10 to 14 illustrate the various circuits used in a handshake module.

DESCRIPTION OF THE PREFERRED EMBODIMENTS

Figure 1:
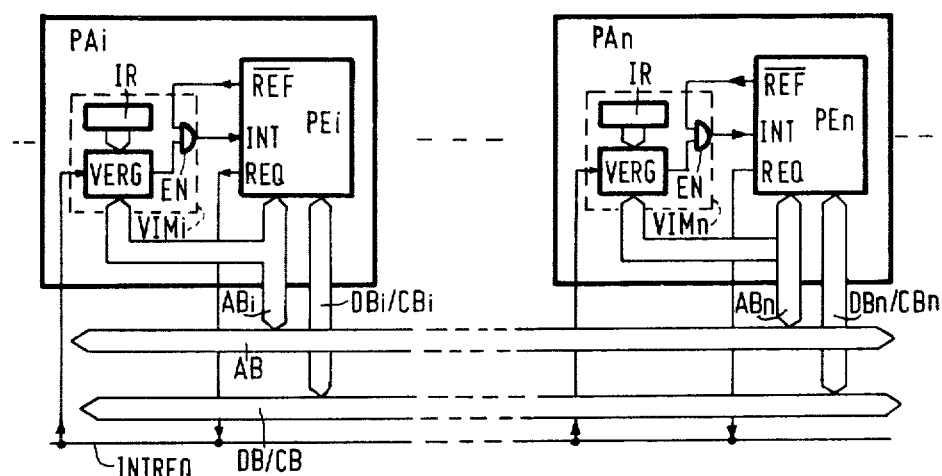
FIG. 1 shows a first example of two signal processor devices (included in a bus system) in accordance with the invention.

FIG. 1 shows two signal processing devices PAi and PAn connected to a bus system. In this example, the bus consists of an address bus part AB, a data and control bus part DB/CB and a separately drawn control line representing an interrupt request signal line INTREQ. It is possible to connect more of such signal processor devices PA to the bus. The whole forms a so-called multiprocessor system.

Corresponding parts of the signal processor devices are indicated by the same reference marks.

The addition . . . i or . . . n indicates the relevant device itself.

PAi contains a conditional interrupt module VIMi and a signal processor module PEi. In this example, the conditional interrupt module VIMi contains an identity address register IR in which the identity address of the signal processor unit PEi itself is included. It also contains a comparator VERG to which an address which is on the address bus AB is applied via subbus ABi. The AND-gates in VIMi are designated by EN.

The signal processor module PEi has an interrupt signal input INT and an interrupt signal output REQ. In this example the latter is connected to the general interrupt request signal line INTREQ. There is also a refuse signal output designated by REF. The processor module receives addresses from bus AB via subbus ABi and data and control signals from bus DB/CB via subbus DBi/CBi. In the processor device PAi, the interrupt request signal line INTREQ is connected to the conditional interrupt module VIMi and, notably in this example, to the comparator VERG. An output of the comparator is connected to a first input of gate EN and the output REF of PEi is connected to a second input of gate EN. The output of gate EN is connected to the interrupt signal input INT of PEi.

The principle of the invention can be simply explained using this arrangement. The operation of the signal processor devices... PAi... PAn included in the bus system shown is as follows:

Assume there is an interrupt request generated by an arbitrary processor module (for further details, see below): there is a signal on the INTREQ line and a particular destination address on AB. The signal on the INTREQ line activates all comparators VERG. The destination address is fed to all comparators VERG and is compared with the identity addresses from the registers IR. If they correspond, a coincidence signal will be generated by the VERG of the conditional interrupt module VIMx which had the same address in IR as the address applied to the AB bus by the interrupting processor. If the relevant processor module PEx is able to accept an interrupt: signal REF (non-refuse state), then gate EN allows a signal to pass and the interrupt signal appears at input INT of PEx. Apart from PEx, all other PE modules are not affected by this operation and can continue their operation without hindrance.

Figure 2:
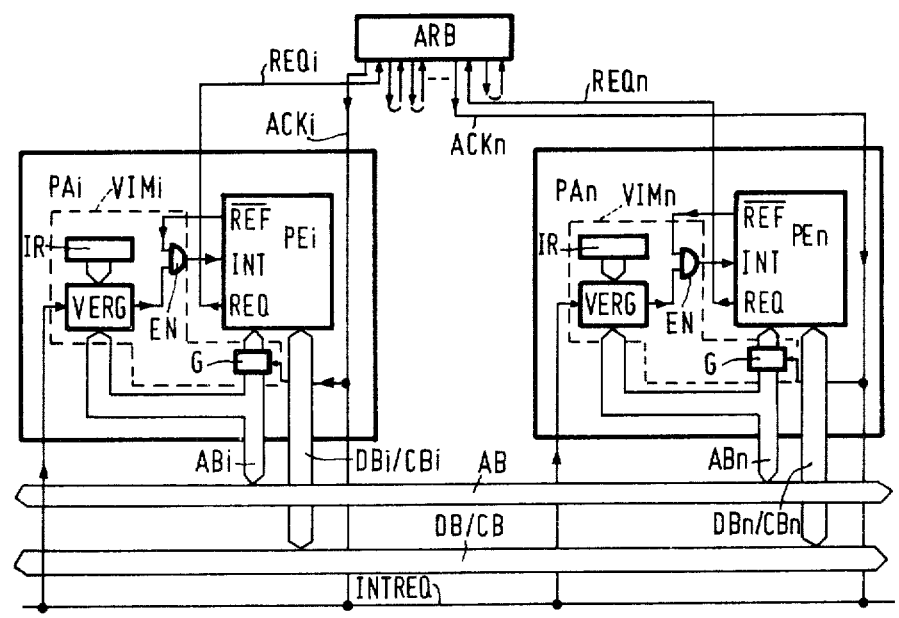
FIG. 2 shows a second example of two signal processor devices (included in a system with arbitration module) in accordance with the invention.
Figure 3:
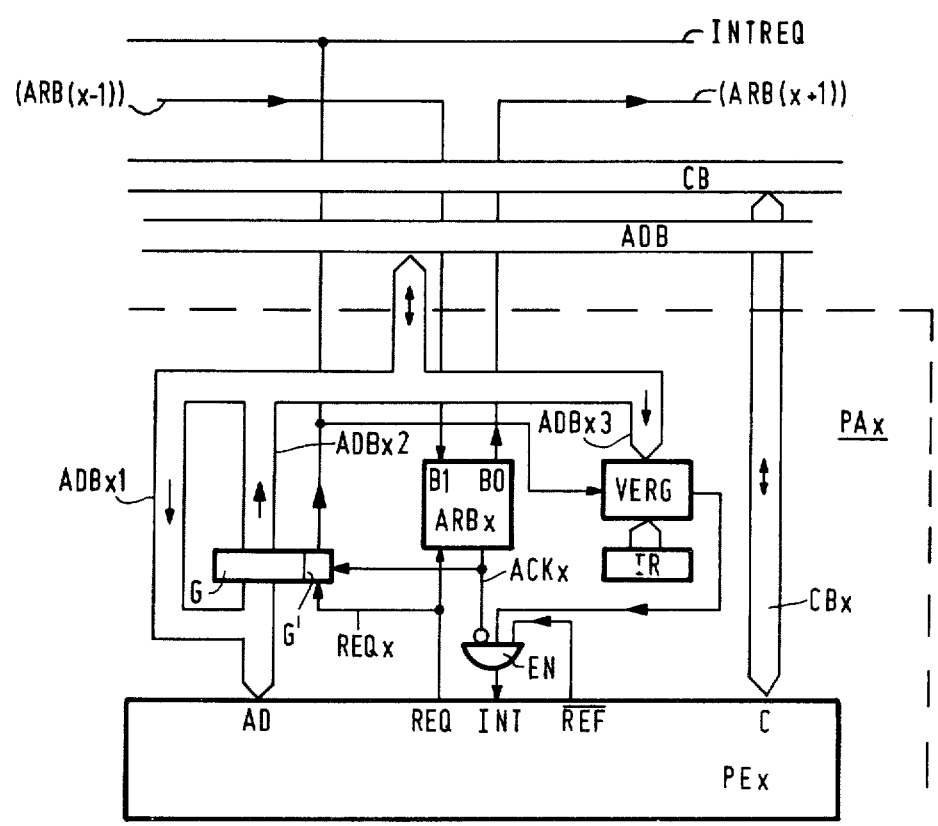
FIG. 3 shows a signal processor device containing an arbitration module.

FIG. 2 illustrates the same solution as that shown in FIG. 1 but here the system has been extended by a so-called central arbitration module ARB. Each signal processor device... PAi... PAn is furthermore provided with gates G. The arbitration module ARB serves to prevent any conflicts which might arise in the system when two or more interrupt requests are made simultaneously. This is done on a priority basis. A particular processor PEx has been given higher priority if it should make an interrupt request (at output REQ) than other processor modules. An example of such an arbitration module is described in IEEE on Computers of September 1975, pages 931-2, FIGS. 3-5. As can be seen in FIG. 2, the outgoing interrupt requests... REQi ... REQn are fed to the arbitration module ARB. Here it is determined which request has priority and should thus be given acknowledgement: one of the outputs... ACKi... ACKn carries an acknowledge signal. This causes an interrupt request to be placed on the INTREQ signal line and the relevant signal processor device PAx comes into action to notify the destination address. Gate G is provided for this purpose. Assume interrupt request REQ coming from PEn has been acknowledged; ACKn-line carries the acknowledge signal. This causes G in PAn to be opened, so that processor module PEn can transfer the destination address of the interrupt request to the AB address bus via subbus ABn. With the signal on INTREQ and the destination address on AB, the procedure is then as shown in FIG. 1. It should be pointed out that, unlike the procedure shown in FIG. 2, the INTREQ line can also be energized directly from ARB if a request has been acknowledged. In this case, each individual connection from . . . PAi . . . PAn to INTREQ can be omitted. FIG. 3 shows a signal processor device containing an arbitration module. Thus, in a system containing two or more of these devices, there is decentralized arbitration processing if more than one interrupt request occurs.

Figure 4:
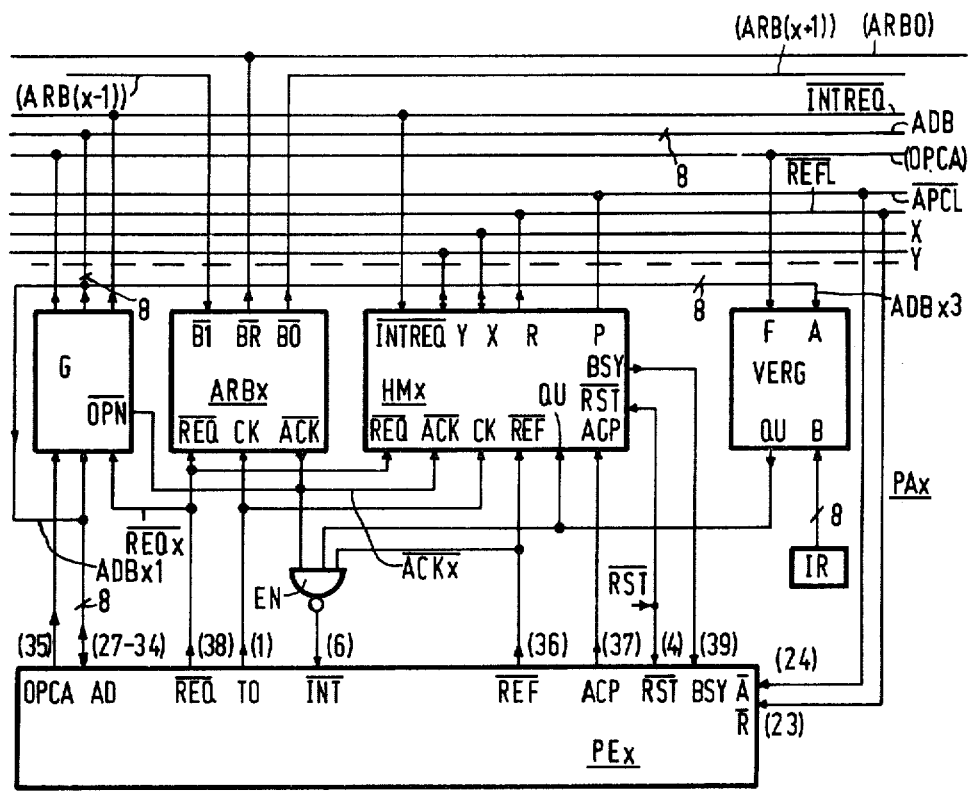
FIG. 4 shows a more detailed illustration of the device shown in FIG. 3.

In FIG. 3, the device PAx is provided with processor module PAx and arbitration module ARBx. The device furthermore contains IR, VERG, EN and G. The last-mentioned is extended with G'. In this example, the address bus and data bus are combined: ADB. The control bus is now indicated by CB. Particularly in the case of a processor device PAx constructed as an integrated circuit, the address data bus ADB will divide on the substrate: ABDx1, 2, 3. The addresses are presented to the processor inputs AD via subbus ABDx1. When the relevant processor module participates in a transfer action, subbus ADBx1 serves for receiving addresses and/or data. Subbus ADBx2 serves for transferring a destination address which is supplied from PEx via gates G at an outgoing interrupt request. Subbus ADBx2 also serves for sending out addresses and/or data during current transfer operations. The control terminals C of the processor are connected to the system bus CB via subbus CBx. Subbus ADBx3 serves for presenting a destination address present on the system address data bus ADB to comparator VERG. The arbitration module has a first input B1 for receiving a first external acknowledge signal. This signal comes from the preceding device PA(x−1), notably from the second output (Bo) of the relevant arbitration module (ARB(x−1) (see the parenthesized destination on the relevant line in FIG. 3). ARBx has a second input to which the outgoing interrupt request REQx is applied. ARBx has a first output at which a (further) acknowledge signal ACKx appears if the signals are present at the two said inputs. ARBx has a second output Bo which carries a signal if, on receipt of a signal at B1, no REQx proves to be present, so that transfer of an outgoing acknowledge signal to a subsequent arbitration module is possible (daisy chain). In FIG. 4, this is designated by (ARB)x+1)) on the line at output Bo of ARBx. The chain is completed by the connection of output Bo of the last arbitration module ARBn in the series of signal processor devices to the input B1 of the first arbitration module ARBo in the series of signal processor devices.

The operation of the device shown in FIG. 3 is as follows: When PEx generates an outgoing interrupt request, REQx is applied to the second input of ARBx. If now the first acknowledge signal is present at B1 (i.e. no preceding processor has made an interrupt request), a (further) acknowledge signal will appear at output ACKx of ARBx. This causes gate G to be opened. The destination address belonging to the interrupt request REQx is allowed to pass and is applied to the system address data bus ADB via subbus ADBx2. The further acknowledge signal also causes part G' of the gates to be opened. As a result, the request signal REQx itself is transmitted to the outside: to the interrupt request signal line INTREQ. If PEx has no outgoing interrupt request but there is a first acknowledge signal present at input B1 of ARBx, this will be fed via output Bo to the next arbitration module (see above). If an interrupt request has been generated, comparators VERG in the devices PAo ... PAn will, as soon as the INTREQ line is energized, ascertain whether the destination address present at ADB is equal to the identity address in IR. If it is, the coincidence signal is applied to the first input of gate EN. If REF is also present, i.e. the relevant processor module does not refuse to accept an interrupt, the interrupt input INT is energized and the processor will open its inputs AD for the receipt of addresses and/or data. The example shown in FIG. 3 may furthermore have an additional facility: comparator VERG may, instead of or in addition to checking whether the identity address is equal to the destination address, check whether whether the identity address is greater than (or, if required less than) the destination address, and if it is also generate, the coincidence signal. In this way an entire subgroup of processor modules can be interrupted, for example, all processor modules starting from a module with a particular number. In such a case it is desirable to take another measure to prevent a conflict from arising: if a destination address designates a processor which has a lower number than the processor module which itself sends out the interrupt request and VERG looks at addresses which are greater than (and equal to) that destination address, the transmitting processor module would be interrupted. In the example shown in FIG. 3, this is prevented by applying the inverse value (marked by a circle) of the (further) acknowledge signal ACKx to the AND-gates EN as an additional condition. For this purpose, EN has a third input. This means that, if there is no ACKx signal, PEx can be interrupted when the coincidence signal and the REF signal are present. If ACKx is present, it will not be possible for PEx to interrupt itself, however.

For a further explanation of the signal processor device and a system employing two or more of these signal processor devices, a more detailed description of the device shown in FIG. 3 will be given below. It will also be explained how control and signal transport synchronization is ensured. For this, a so-called handshake module is required which will also be discussed below.

FIG. 4 shows a more detailed embodiment of the invention. Corresponding components are indicated in the same way as in FIG. 3. In this connection it should be pointed out that most signal notations are provided with a bar (=inverse sign.). This originates from practice where a logic 1 represents a low voltage level and a logic 0 a high voltage level. The processor module PEx used in this example is, for instance, the type 8048 microprocessor. To indicate the connections in the whole system, the terminal numbers of the 8048 are given in parentheses at the respective terminals.

The OPCA output is the output on which appears a (single bit) operation code for determining how the address is to be processed, i.e. the operation is either "is addressed equal to" or "is identity address greater than", depending on the value of OPCA (see later). AD are the terminals for the connection to the address data bus. REQ is the interrupt signal output. TO is a clock signal output. INT is the interrupt signal input. REF is the refuse signal output. ACP is an accept signal output. RST is a reset input. BSY is a busy signal input. A is an accept signal input and R is a refuse signal input.

Gates G have an input OPN which is connected to the output ACK of the arbitration module ARBx. The arbitration module ARBx has inputs REQ, CK and B1 and outputs ACK, BR and Bo. As far as function is concerned, they correspond to those shown in FIG. 3 in which there is still a clock input CK and a signal output which is used to notify that there is an interrupt request. This signal is supplied to line (ARBO) which leads to the arbitration module ARBO. This is the arbitration module at the beginning of the series of arbitration modules constituting the daisy chain. In the ARBO, the line (ARBO) is connected to input B1. This is used to block everything: all arbitration modules are notified that "somewhere" an interrupt request has been acknowledged ("somewhere" an ACK signal has also been generated). This immediately ensures that no second request can be transmitted. For a better understanding of this form of arbitration processing, the reader is referred to an article by Thurber in Fall Joint Comp. Conf. 1972, pages 723–724.

The handshake module of PAx is designated by HMx. This module has inputs REQ, ACK, CK, REF, QU, ACP, RST and INTREQ; outputs BSY (busy) and R (refuse output) and P (accept output).

X and Y are the handshake inputs and outputs.

The handshake module outputs R, P, X and Y are connected with bus lines: refuse bus line REFL, acceptance bus line ACPL and signal lines X and Y respectively. The comparators VERG have inputs F (for the operation code=or greater than) indicating how the address is to be processed, A (address inputs), B (identity address inputs) and an output QU which delivers a coincidence signal if the selected condition (=or greater than) is satisfied.

The operation of the device shown in FIG. 4 is essentially similar to the operation of the device described with reference to FIG. 3. The synchronization between the control and data signal transport with further devices present outside the processor device is here ensured by the handshake module.

The construction and operation of the various parts in FIG. 4 are described in greater detail below.

Figure 5:
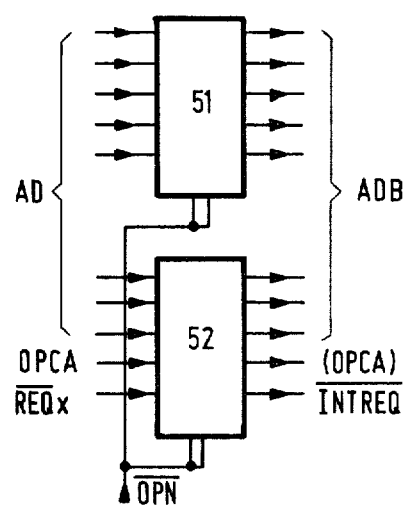
FIG. 5 shows the gates in detail.
Figure 6:
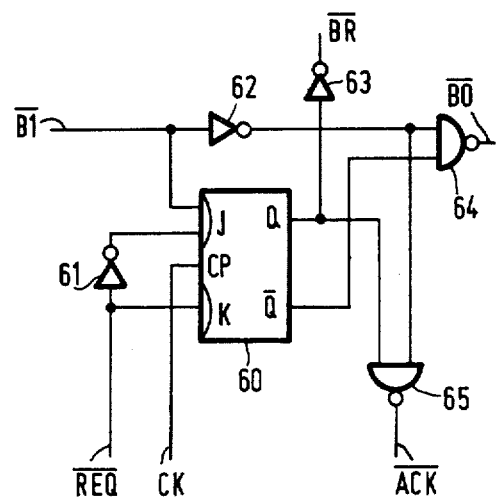
FIG. 6 shows an arbitration module in detail.

FIG. 5 shows the gates G which are used, in this example, to transfer a total of ten inputs OPCA, AD (8 lines) and REQx to the outputs which are connected to the line (OPCA), the address data bus ADB and the interrupt request signal line INTREQ respectively. This occurs at the command of the signal at input OPN which gives the acknowledgement (ACKx from ARBx). In this example, the gates are two type 74365A buffer drives which are indicated by 51 and 52 in FIG. 5. FIG. 6 shows an arbitration module in detail. The connections are similar to those of the arbitration module ARBx in FIG. 4. 60 is a JK flip-flop. 61,62 and 63 are inverters, 64 and 65 are NANDs. The operation can be indicated in the usual way using the rules of logic. $B0 = B1 \cdot \overline{BR}$ means: the incoming acknowledge signal B1 is passed on to the output because there has been no change in the state of flip-flop ($\overline{Q} = 1 = \overline{BR}$).

$ACK = B1 - BR$ means: ACK is generated if the flip-flop has changed state ($BR = 1$). Since $B1 = 1$ is also present, the acknowledge signal for the interrupt is passed on: ACK. The generation of the new BR*(*because of a next clock phase) can be indicated logically for the arrangement drawn by $BR^*: = REQ \, (\overline{B1} + BR)$ in which BR is the state of the previous clock phase. For the purpose of illustration, it may be observed that the circuit may comprise the following components: JK flip-flop 7472, inverters 7404 and 7406 and NANDs 7400.

Figure 7:
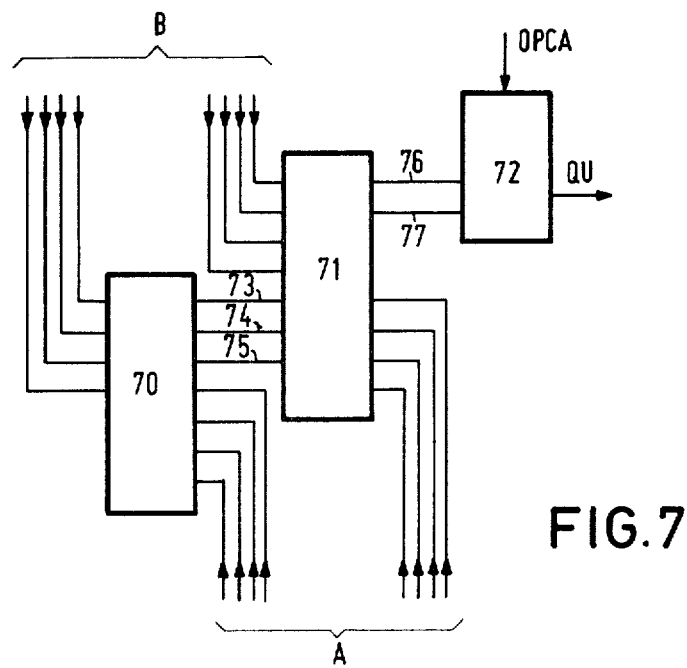
FIG. 7 shows comparators in detail.

FIG. 7 shows the comparator module VERG in detail. Here A are the eight address inputs for the transfer of addresses from the ADB bus. B are the eight identity address inputs. Inputs A and B are inputs of two comparator circuits 70, 71 (e.g. type 7485) which are interconnected (lines 73, 74, 75). Output 76 is used for a B>A signal and output 77 is used for an A=B signal. In selector circuit 72 (e.g. type 74157), the operation command OPCA which has a logic 0— or 1— value, causes signal B>A or signal A=B (if present) to be passed on to the output QU.

Thus, in accordance with the value of the operation code, it is determined in 72 whether identity address code B satisfies the condition set. If it does, the relevant processor module receives a request for an interrupt: QU connected to the input of gate EN, whose output is connected to the INT input of the processor module (see FIG. 4). The logic formula for FIG. 7 is as follows: $QU=(F.(B=A)+\overline{F}.(B>A)$.

Figure 8:
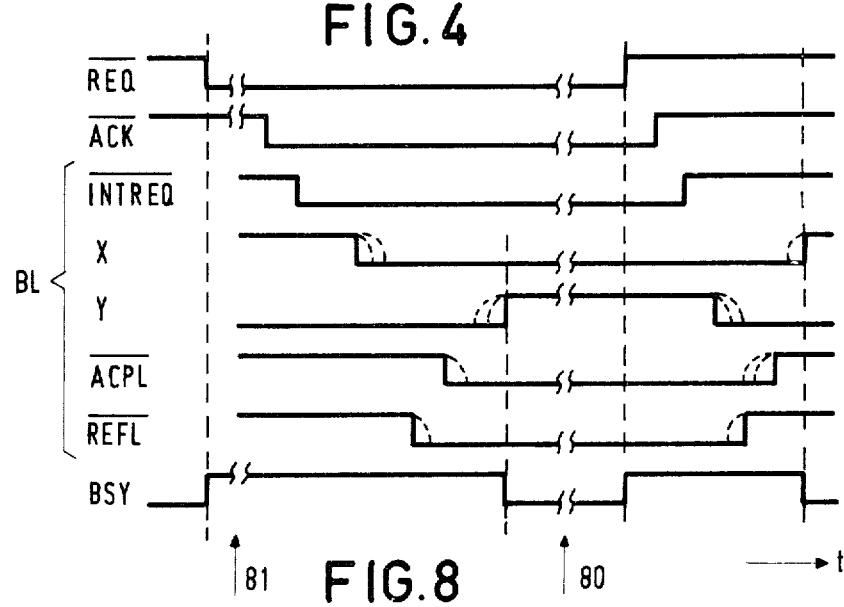
FIG. 8 shows a timing diagram of a handshake procedure.

FIG. 8 shows the timing diagram of the handshake procedure obtained with the aid of the handshake module HMx. The group of diagrams indicated by BL show the shapes of the signals on the relevant bus lines $\overline{IN}$ $\overline{TREQ}$, X, Y, $\overline{ACPL}$,$\overline{REFL}$. Arrow 81 points to the interval (see the lines at REQ and ACK) between the receipt of $\overline{REQ}$ and the acknowledge signal $\overline{ACK}$ given by the arbitration module. Arrow 80 points to the interval within which the operations constituting the interrupt are taking place. The dots shown at the various pulse edges point to the fact that there are time variations owing to differences in the response rates of the processor devices present and also owing to the differences in the travelling distances along the bus. The arrangement should be such that no confusion or errors can occur. The appropriate measures are therefore taken in each handshake module. BSY (busy in connection with the handshake procedure) can be expressed as:

$$BSY = REQ.\overline{Y} + \overline{ACK} + REQ.X$$

The conditions on the bus lines BL must be seen in terms of time. This can be done with sequential logic which can be easiest described with so-called state diagrams.

FIG. 9 shows the state diagrams relating to this example. FIGS. 9a, 9b and 9c show state diagrams for the states SA, SB, SC, SD, SE, SF, SG and SH. The conditions leading from one state to another are also indicated.

For the meanings, see again the preceding description (FIGS. 4–7).

The result is shown in FIG. 9d: the signal values (logic values) of the handshake module outputs X, Y, P (to line ACPL), R (to line $\overline{REFL}$) and further those corresponding to the states of two flip-flops 120 and 130 (see FIGS. 12 and 13) become as shown in the matrix of FIG. 9d.

FIGS. 10, 11, 12, 13 and 14 show the circuits with which all signals are processed or shaped for the handshake procedure shown in FIGS. 8 and 9.

In FIG. 10, 100 refers to a gate circuit (e.g. type 74153) which serves to produce the busy signal BSY with the input signals $\overline{REQ}$, $\overline{ACK}$, X and Y at the inputs.

Figure 12:
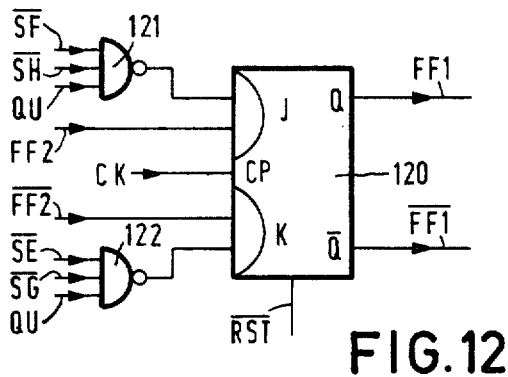
Figure 13:
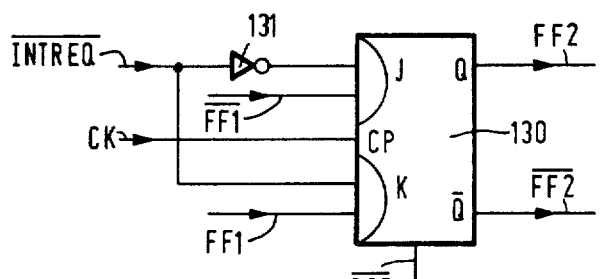
Figure 14:
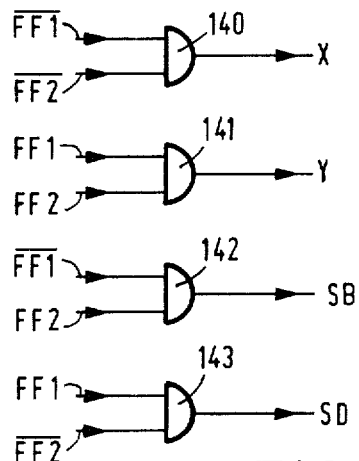

In FIG. 11, 110 and 111 refer to two JK flip-flops which are used to produce the output signals R (refuse signal from the handshake module) and P (acceptance signal). For this purpose, signals QU,SB,SD and, after inversion of $\overline{REF}$ in inverter 112, signal REF are at the inputs of 110. Output Q of 110 delivers state signal $\overline{SE}$ (after inversion in 113, that is the said refuse signal R) and output $\overline{Q}$ delivers the state signal $\overline{SF}$. 111 receives signals QU, SB and ACP and SD at its inputs. Output Q delivers state signal $\overline{SG}$ (after inversion in 114, that is the said acceptance signal P) and output $\overline{Q}$ delivers state signal SH. CP are clock inputs for the clock signal CK and a reset is ensured via the terminals indicated by $\overline{RST}$. In FIG. 12, the internal states FF1 and $\overline{FF1}$ are generated with flip-flop 120 and NANDs 121 and 122 while the internal states FF2 and $\overline{FF2}$ are generated with flip-flop 130 and NANDs 131 and 132 as shown in FIG. 13. For this purpose, the state signals $\overline{SF}$, $\overline{SH}$ and signal QU are applied to NAND 121 and signals $\overline{SE}$, $\overline{SG}$ and QU to NAND 122. The output of 121 and signal FF2 are applied to the J input of 120. The output of 122 and signal $\overline{FF2}$ are applied to the K input of 120. The J inputs of 130 receive signals INTREQ (that is $\overline{INTREQ}$ after inversion in 131) and $\overline{FF1}$. The K inputs receive $\overline{INTREQ}$ and FF1. The gates 140, 141, 142 and 143 of FIG. 14 together with the four combinations of FF1, FF2 and $\overline{FF1}$, $\overline{FF2}$ deliver the state signals X, Y and SB and SD.

Figure 15:
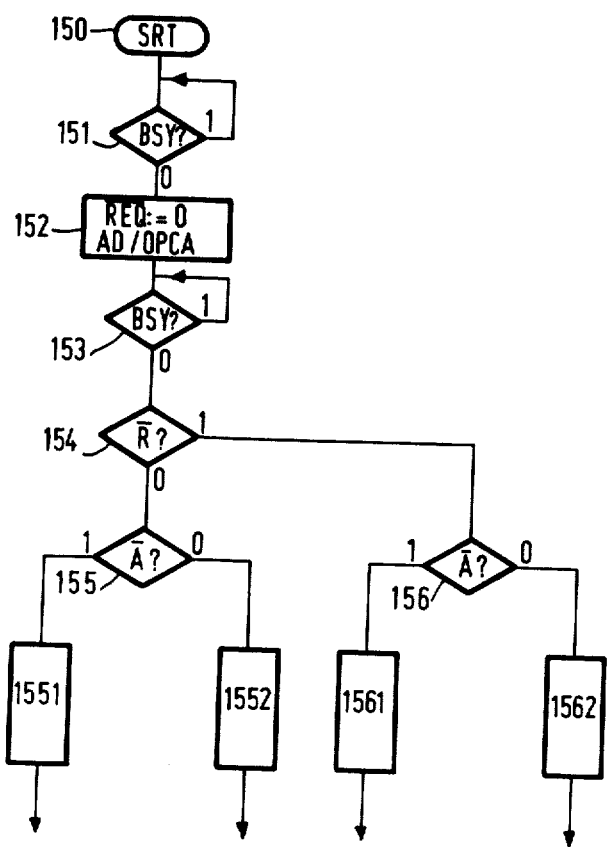
FIG. 15 gives an example of a flow diagram of the procedure taking place in an interrupting processor module.

FIG. 15 shows the flow diagram representing the events taking place in an interrupting processor. Start block 150 (STR) indicates the beginning of a communication procedure. During this procedure, a check is made to find out whether any previous operation has been terminated: block 151. Here the reader may be referred to the timing diagram of FIG. 8, BSY signal on the right-hand side. If BSY=0, the procedure can be started (block 152): signal BSY enters the processor module (see input BSY (39) of PEx, FIG. 4) and this makes REQ: =0. This means that the interrupt request is transmitted (terminal (38) FIG. 4).

Furthermore, the destination address AD of the request and the operation code OPCA determining how the address is to be processed are now transmitted (terminals (27–34) and (35) of FIG. 4).

Then another check is made to ascertain whether BYS=0, step 153. If it is not, there will be a delay. If it is, step 154 is reached. A check is then made to determine whether $\overline{R}=0$ or $\overline{R}=1$. This signal R is at input (23) of the processor, see FIG. 4, and serves to notify the processor whether there is a logic 1 or a 0 on the refuse bus line $\overline{REFL}$. If $\overline{REFL}=\overline{R}=0$, then step 155 is reached. Here it is determined whether $\overline{A}=0$ or $\overline{A}=1$ (input (24) of PEx). This signal is used to notify the processor whether there is an acceptance and is presented thereto by an acceptance bus line $\overline{ACPL}$. Steps 154, 155 and 156 achieve the following: if $\overline{R}=0$, i.e. a refusal has been given somewhere, this is investigated further in step 155; a check is made to find out whether there is nevertheless an acceptance somewhere. If $\overline{A}=1$ there is nowhere an acceptance, i.e. all processors for which the combination of destination address AD and the address operation OPCA is satisfied refuse an interruption. In such a case step 1551 causes an appropriate signal to be delivered. If, on the other hand, $\overline{A}=0$, there is nevertheless an acceptance or there are nevertheless acceptances somewhere. That means that some processors for which the combination of destination address and operation OPCA is satisfied refuse but that some accept the interrupt. Step 1552 causes an appropriate signal to be delivered in such a case. If on the other hand, step 154 ascertains that $\overline{R}=1$ i.e. that a refusal has been given nowhere, this is further investigated in step 156: $\overline{A}=0$ or $\overline{A}=1$. If $\overline{A}=1$ there is nevertheless no acceptance: there are no processors for which the combination of destination address and address operation is satisfied. Step 1561 causes an appropriate signal to be delivered in such a case. If, on the other hand, step 156 ascertains that $\overline{A} \div 0$, this means that all processors for which the combination of destination address and address operation is satisfied are interrupted.

Steps 1562 causes an appropriate signal to be delivered in such a case.

Figure 16:
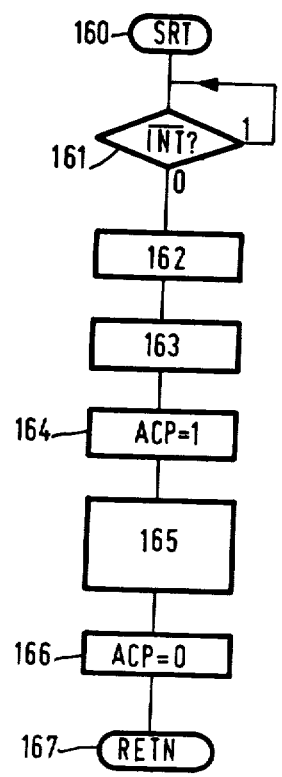
FIG. 16 gives an example of a flow diagram of the procedure taking place in an interrupted processor module.

FIG. 16 shows a flow diagram representing the succession of events taking place in an interrupted processor as described above. Start block 160 (SRT) indicates the beginning of the procedure. In step 161, it is monitored whether $\overline{INT}=0$ occurs. If it does, there is a request and action will be taken: step 162. In step 162, the current instruction is terminated. In step 163, the preparations for the interrupt are made and in step 164, it is notified to the outside ACP=1 (output (37) of the processor, see FIG. 4) that acceptance is possible. The interrupt operations then take place: step 165. When these operations have been completed, the processor transmits ACP=0 (step 166), thus terminating the acceptance. The processor finally returns to its state prior to the interrupt: RETN (step 167).

What is claimed is:

1. A signal processor device having a processor module for use in a multiprocessor system with distributed interrupt handling by at least more than one processor device, said processor module having address, data and control inputs and outputs, including an interrupt signal input for receiving an incoming interrupt request signal, comprising: at least one conditional interrupt means for comparing an identity address of said processor module upon detecting address coincidence;

said conditional interrupt means being provided with:

input means for receiving an external interrupt request signal with corresponding destination address;

comparator means connected to said input means for comparing its own identity address with said destination address upon receiving said external interrupt request signal;

output means for said comparator for transmitting a coincidence signal to said processor module when it has been established that the two said addresses are in agreement;

a first gating means for gating said coincidence signal to be conditionally applied to the interrupt signal input of said signal processor module; and wherein said signal processor device has an interrupt signal output means for transmitting an outgoing interrupt request signal to outside said device characterized in that:

said conditional interrupt means is further provided with a second gating means for passing an outgoing destination address from said processor module corresponding to the outgoing interrupt request; and wherein said second gating means includes a control input means serving for receiving an acknowledge signal indicating that the outgoing interrupt request has been acknowledged;

and said signal processor device further including:

an arbitration means having a first input for receiving a first external acknowledge signal from outside the device and a second input for passing on an outgong interrupt request signal from said processor module;

and said arbitration module generating a second internal acknowledge signal if said two signals are present at a first output of said arbitration means, which second acknowledge signal is fed to control input means of said second gating means with which the outgoing interrupt request signal and the destination address are released, and at a second output of said arbitration means a third outgoing acknowledge signal appears if, upon receipt of the said first external acknowledge signal, no outgoing interrupt request signal from said processor module occurs.

2. The signal processor device as claimed in claim 1, characterized in that:

said conditional interrupt means includes comparator means capable of determining not only whether the identity address of said processor module is equal to the destination address presented, but also whether the identity address is greater or less than the destination address and, depending on the result, an interrupt signal is fed to the interrupt signal input means of said signal processor device.

3. The signal processor device as claimed in claim 1 characterized in that:

said conditional interrupt means is provided with said first gating means with first input means for receiving the said coincidence signal and second input means for receiving a second signal indicating that said processor module is in a state allowing an interrupt.

4. The signal processor device as claimed in claim 3 characterized in that:

said first gating means are provided with third input means for passing on a third signal indicating that there is no acknowledgement for transmitting an interrupt request signal from said signal processor indicating that interruption of said signal processor is possible, provided the other conditions at said first and second input means of said gating means are satisfied.

5. The signal processor device as claimed in claim 1 further including a handshake means for ensuring the control and signal transport synchronization with other devices external to said signal processor device is ensured.

6. The signal processor device as claimed in claim 1 characterized in that it is a solid-state device integrated on a substrate.

* * * * *